United States Patent
Sato

(10) Patent No.: US 11,407,071 B2
(45) Date of Patent: Aug. 9, 2022

(54) MACHINE TOOL

(71) Applicant: MAKINO MILLING MACHINE CO., LTD., Tokyo (JP)

(72) Inventor: Takatoshi Sato, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 104 days.

(21) Appl. No.: 16/484,028

(22) PCT Filed: Feb. 7, 2017

(86) PCT No.: PCT/JP2017/004442
§ 371 (c)(1),
(2) Date: Aug. 6, 2019

(87) PCT Pub. No.: WO2018/146728
PCT Pub. Date: Aug. 16, 2018

(65) Prior Publication Data
US 2019/0389016 A1   Dec. 26, 2019

(51) Int. Cl.
*B23C 1/12* (2006.01)
*B23Q 1/01* (2006.01)
(Continued)

(52) U.S. Cl.
CPC .............. *B23Q 1/48* (2013.01); *B23C 1/002* (2013.01); *B23C 1/12* (2013.01); *B23Q 1/012* (2013.01);
(Continued)

(58) Field of Classification Search
CPC .................. B23Q 1/54; B23Q 1/5406; Y10T 409/307678; Y10T 409/308232; Y10T 409/308512; B23C 1/12
(Continued)

(56) References Cited

U.S. PATENT DOCUMENTS 4,632,615 A * 12/1986 Yamamura ............. B23Q 1/017
408/234
6,357,094 B1   3/2002 Sugimoto
(Continued)

FOREIGN PATENT DOCUMENTS

CN   202571834 U   12/2012
DE   19850603 A1 *  3/2000
(Continued)

OTHER PUBLICATIONS

International Search Report dated Apr. 25, 2017, directed to International Application No. PCT/JP2017/004442; 2 pages.

*Primary Examiner* — Erica E Cadugan
(74) *Attorney, Agent, or Firm* — Morrison & Foerster LLP

(57) ABSTRACT

A machine tool has: a main shaft head that supports the main shaft; a main shaft head support part which supports the main shaft head such that the main shaft head can rotate around a first axis that extends perpendicular to the main shaft axis of rotation; a first rotary feed shaft device which is provided in the main shaft head support part, and rotates and feeds the main shaft head around the first axis; a saddle which supports the main shaft head support part such that the main shaft head support part can rotate around a second axis that is perpendicular to the first axis and inclined with respect to the vertical direction; and a second rotary feed shaft device which is provided in the saddle, and rotates and feeds the main shaft head support part around a second axis of rotation.

4 Claims, 2 Drawing Sheets

(51) Int. Cl.
  *B23Q 1/48* (2006.01)
  *B23Q 1/54* (2006.01)
  *B23C 1/00* (2006.01)
  *B23Q 1/62* (2006.01)

(52) U.S. Cl.
  CPC .............. *B23Q 1/015* (2013.01); *B23Q 1/017* (2013.01); *B23Q 1/5406* (2013.01); *B23Q 1/621* (2013.01); *Y10T 409/308288* (2015.01); *Y10T 409/308512* (2015.01); *Y10T 409/309576* (2015.01)

(58) Field of Classification Search
  USPC .......................................... 409/201, 211, 216
  See application file for complete search history.

(56) References Cited

U.S. PATENT DOCUMENTS

| | | | |
|---|---|---|---|
| 6,427,098 B1 * | 7/2002 | Alverson | G05B 19/4086 |
| | | | 700/245 |
| 8,714,535 B2 * | 5/2014 | Jung | B23Q 1/012 |
| | | | 269/57 |
| 2003/0069115 A1 | 4/2003 | Binder | |
| 2010/0034610 A1 * | 2/2010 | Yoneyama | B23Q 1/0009 |
| | | | 409/231 |
| 2013/0205947 A1 * | 8/2013 | Takahashi | B23Q 1/52 |
| | | | 74/665 B |
| 2020/0276677 A1 * | 9/2020 | Takahashi | B23Q 16/001 |

FOREIGN PATENT DOCUMENTS

| | | |
|---|---|---|
| DE | 10061934 B4 | 6/2005 |
| DE | 102009011443 A1 * | 7/2010 |
| EP | 517168 A2 * | 12/1992 |
| EP | 1050387 A1 * | 11/2000 |
| EP | 1114694 A1 | 7/2001 |
| EP | 1250976 A1 * | 10/2002 |
| EP | 1291130 A2 | 3/2003 |
| EP | 1700653 A1 * | 9/2006 |
| EP | 2123392 A1 * | 11/2009 |
| EP | 2305418 A1 | 4/2011 |
| JP | 10-277857 A * | 10/1998 |
| JP | 2004-338007 A | 12/2004 |
| JP | 2015-182170 A | 10/2015 |
| WO | 00/51779 A2 | 9/2000 |
| WO | WO-2012/099323 A2 * | 7/2012 |

* cited by examiner

MACHINE TOOL

CROSS-REFERENCE TO RELATED APPLICATIONS

This application is a U.S. national phase patent application of International Patent Application No. PCT/JP2017/004442, filed Feb. 7, 2017.

FIELD OF THE INVENTION

The present invention relates to a machine tool comprising two rotary feed axes which control the posture of a tool and three linear feed axes which move the position of a workpiece relative to the tool.

BACKGROUND OF THE INVENTION

There are various types of multi-axis machine tools comprising at least one rotary feed axis in addition to orthogonal three-axis linear feed axes, depending on the configuration of the feed axes. Patent Literature 1 describes an example of a machine tool comprising two rotary feed axes which control the posture of a tool, and three linear feed axes which move the position of a workpiece relative to the tool. In such a machine tool, the two rotary feed axes are moved relative to the workpiece in the linear direction along with a spindle head which rotatably supports the spindle on which the tool is mounted. Thus, the weight of the moving body including the two rotary feed axes and the spindle heads increases, and the column that movably supports the moving body with respect to a fixed part such as a bed of a machine tool may deform.

In particular, in the machine tool of Patent Literature 1, the carriage, saddle, head holder and spindle head constituting the moving body protrude with a significant overhang in the X-axis direction from a cross rail which is laterally mounted near the upper end of the column. Thus, in the machine tool of Patent Literature 1, the column and the cross rail may torsionally deform, whereby machining accuracy is reduced.

PATENT LITERATURE

[PTL 1] Japanese Unexamined Patent Publication (Kokai) No. 2015-182170

BRIEF SUMMARY OF THE INVENTION

The object of the present invention is to solve such problems of the prior art and to provide a machine tool comprising two rotary feed axes which control the posture of a tool, and three linear feed axes which move the position of a workpiece relative to the tool, in which the position of the center of gravity of the moving body including the spindle head that rotatably supports the spindle to which the tool is attached is located so as to reduce the overhang from a fixed part such as the bed of the machine tool.

In order to achieve the above objects, according to the present invention, there is provided a machine tool having two rotary feed axes which control the posture of a tool, and a linear feed axis which moves a position of a workpiece relative to the tool, the machine tool comprising a spindle having a tip on which the tool is mounted, a spindle head which supports the spindle so as to be rotatable around an axis of rotation of the spindle, a spindle head support part which supports the spindle head so as to be rotatable around a first axis which extends perpendicular to the axis of rotation of the spindle, a first rotary feed axis device which is provided on the spindle head support part and which rotatably feeds the spindle head around the first axis, a saddle which supports the spindle head support part so as to be rotatable around a second axis which is perpendicular to the first axis and which is inclined with respect to the vertical direction, and a second rotary feed axis device which is provided on the saddle and which rotatably feeds the spindle head support part around the second axis of rotation.

According to the present invention, in a machine tool comprising two rotary feed axes which control the posture of a tool, and three linear feed axes which move the position of a workpiece relative to the tool, the overhang of a moving body comprising the two rotary feed axes and the spindle head can be reduced by inclining one of the two rotary feed axes, whereby deformation of the machine tool due to the weight of the moving body can be reduced.

DETAILED DESCRIPTION OF THE INVENTION

A preferred embodiment of the present invention will be described below.

Figure 1:
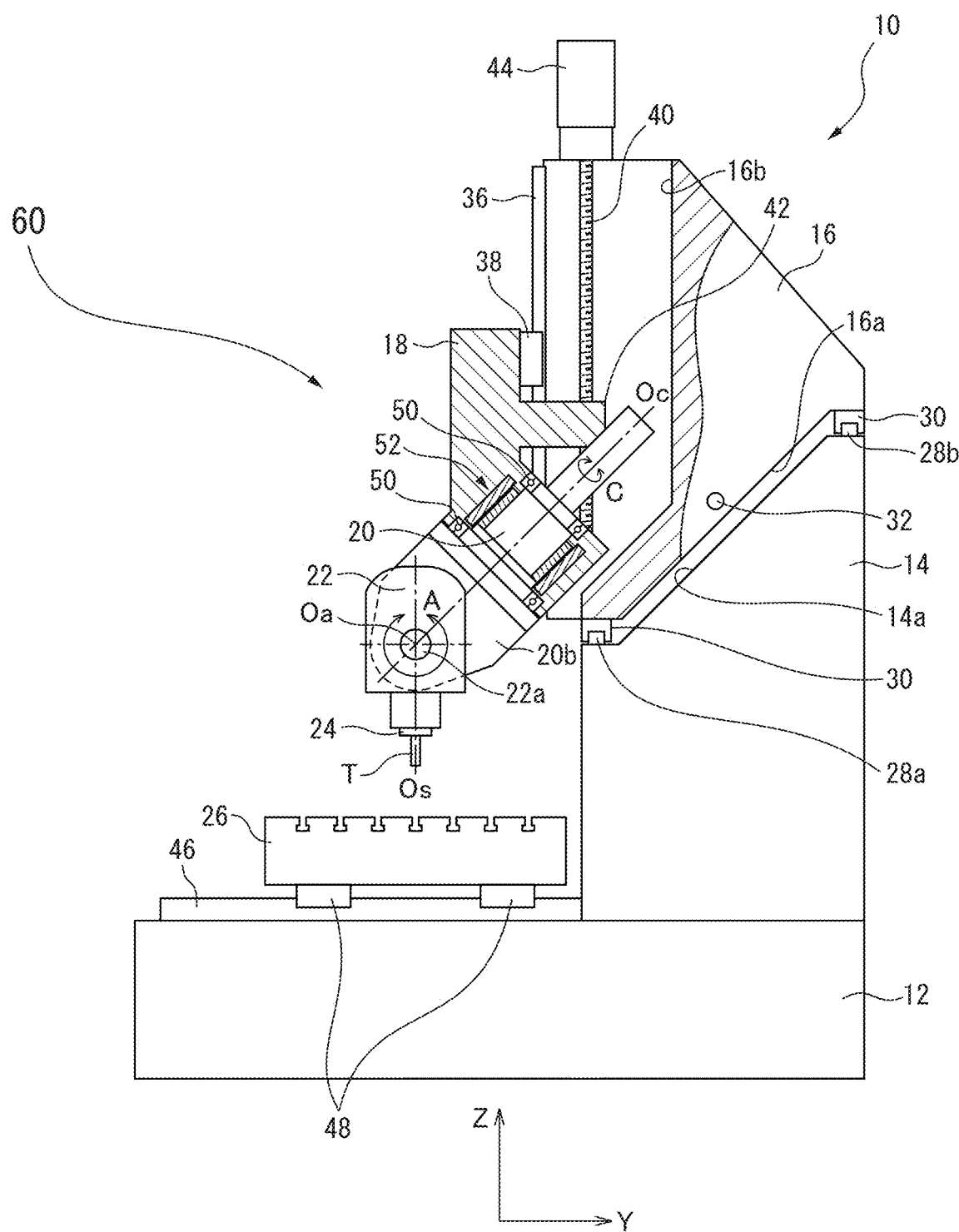
FIG. 1 is a partially broken side view of a machine tool according to a preferred embodiment of the present invention.
Figure 2:
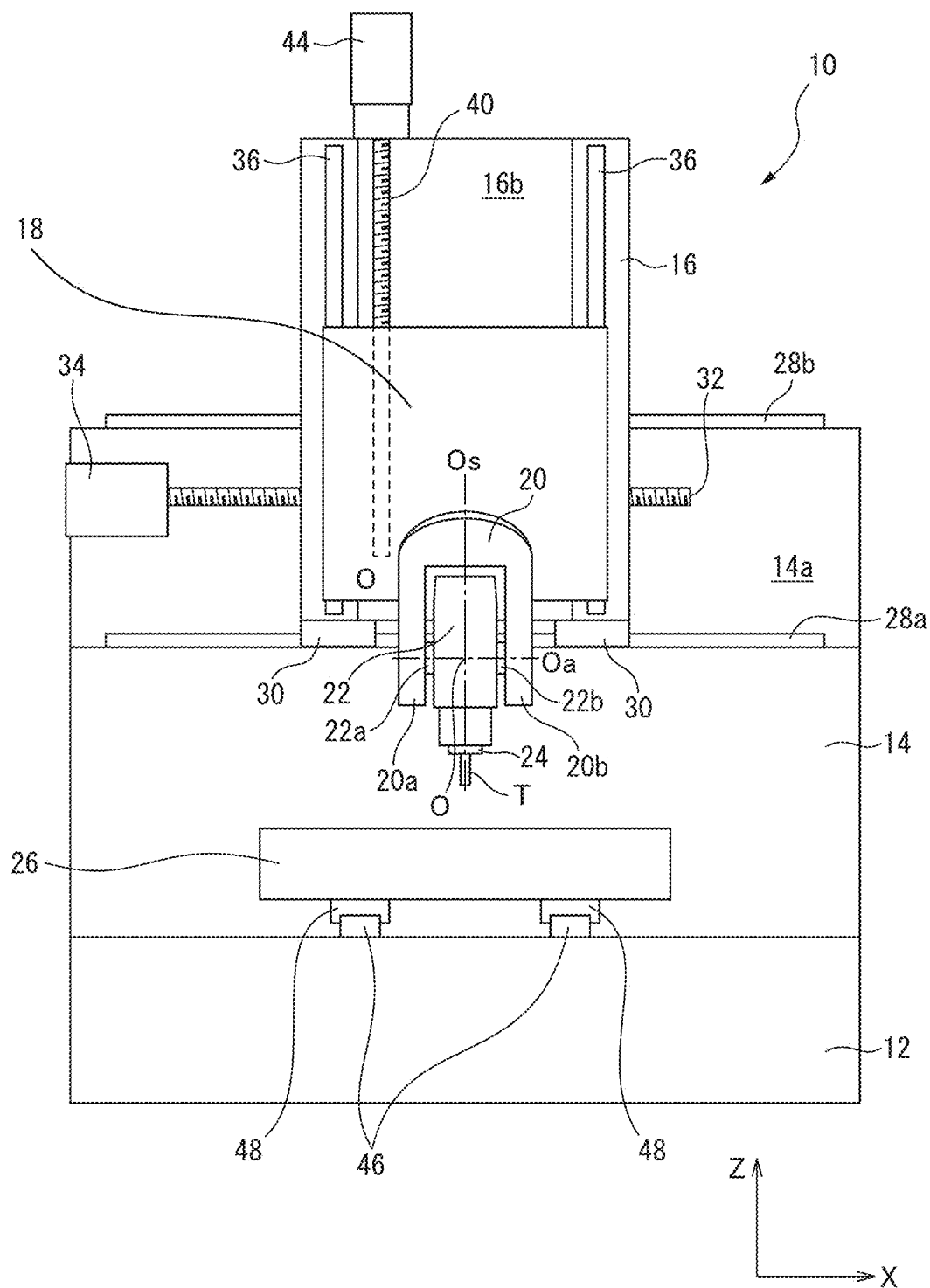
FIG. 2 is a front view of the machine tool of FIG. 1.

FIGS. 1 and 2 show an example of a machine tool comprising two rotary feed axes which control the posture of a tool, and three linear feed axes which move the position of a workpiece relative to the tool. The machine tool 10 comprises a bed 12 as a base which is secured to the floor of a factory, a column 14 which stands on and is secured to an upper surface of the bed 12 on a rear end side thereof (the right side in FIG. 1), a table 26 which is provided on an upper surface of a front portion of the bed 12 (the left side in FIG. 1) so as to be movable in the forward and rearward directions or the Y-axis direction (the left and right directions in FIG. 1) and to which a workpiece is secured, a spindle head 22 which is provided above the table 26 and which rotatably supports a spindle 24, a saddle 16 which is provided on the top of the column 14 so as to be movable in the left and right directions or the X-axis direction (the direction perpendicular to the sheet of FIG. 1), and a spindle head support part 60 which is provided on the saddle 16 and which supports the spindle head 22 so as to be rotatable around an axis of rotation Oa. The spindle head support part 60 comprises a Z-axis slider 18 which is attached to the front surface of the saddle 16 so as to be movable in the upward and downward directions or the Z-axis direction, and a C-axis pivot shaft 20 which is supported on the Z-axis slider 18 so as to be rotatable around an inclination axis Oc as a second axis of rotation in the C-axis direction.

A pair of X-axis guide rails 28 which extend in the horizontal X-axis direction (the directions perpendicular to the sheet of FIG. 1) are provided on the upper end of the column 14, and a guide block 30 is attached to the column 14 so as to slide on the X-axis guide rails 28. A ball screw 32 which extends in the X-axis direction, and an X-axis servo motor 34 connected to one end of the ball screw are provided as an X-axis feed device for reciprocatively driving the saddle 16 along the X-axis guide rails 28, and a nut (not illustrated) for engagement with the ball screw 32 is attached to the saddle 16. Furthermore, an inclined surface 14a is formed on the upper end of the column 14. The inclined surface 14a extends diagonally upward parallel to the X-axis from the front surface side toward the rear surface side of the machine tool 10. The angle of the inclined surface 14a can be set to, for example, 45° relative to the horizontal plane (the XY plane).

A pair of Z-axis guide rails 36 extend on a front surface of the saddle 16 in the Z-axis direction (the upward and downward directions in FIGS. 1 and 2), which is the vertical direction, and a guide block 38 is attached to the Z-axis slider 18 so as to slide on the Z-axis guide rails 36. A ball screw 40 which extends in the Z-axis direction, and a Z-axis servo motor 44 connected to one end of the ball screw 40 are provided on the saddle 16 as a Z-axis feed device for reciprocatively driving the Z-axis slider 18 along the Z-axis guide rails 36, and a nut for engagement with the ball screw 40 is attached to the Z-axis slider 18 (a bracket 42 for attachment of the nut is illustrated in FIG. 1).

The C-axis pivot shaft 20 is rotatably supported on a lower end part of the Z-axis slider 18 by a bearing 50 so as to rotate about the inclination axis Oc. The inclination axis Oc extends diagonally upward from the front surface side to the rear surface side of the machine tool 10 perpendicular to the X-axis and substantially parallel to the inclined surface 14a. Though it is sufficient that the inclination axis Oc and the inclined surface 14a be inclined in the same direction, it is more effective if they are inclined nearly parallel with each other. The Z-axis slider 18 has incorporated therein a C-axis servo motor 52 as a C-axis feed device or a second rotational feed device for rotationally driving the C-axis pivot shaft 20. A pair of left and right arms 20a, 20b which extend parallel to the inclination axis Oc are formed on the tip of the front surface side of the C-axis pivot shaft 20.

The spindle head 22 supports the spindle 24 so as to be rotatable around the spindle axis Os, and a tool T is mounted on the tip of the spindle 24. The spindle head 22 is arranged between the pair of left and right arms 20a, 20b of the C-axis pivot shaft 20. The spindle head 22 is supported on the arms 20a, 20b of the C-axis pivot shaft 20 of the spindle head support part 60 so as to be rotatable in the A-axis direction about the axis of rotation Oa as a first axis of rotation which is perpendicular to the inclination axis Oc by A-axis pivot shafts 22a, 22b formed on the side parts thereof. An A-axis servo motor as an A-axis feed device or a first rotational feed device which is connected to one of the A-axis pivot shafts 22a, 22b (the A-axis pivot shaft 22a in the present embodiment) is incorporated in one of the arms 20a, 20b (the arm 20a in the present embodiment).

Note that the inclination axis Oc passes through the vicinity of the intersection O of the spindle axis Os of the spindle 24 and the axis of rotation Oa. Furthermore, as shown in FIG. 2, the rotational position of the C-axis feed device at which the axis of rotation Oa is parallel to the horizontal X-axis is set as the origin position of the C axis. Further, when the X-axis is in the origin position, the rotational position of the A-axis feed device at which the spindle axis Os of the spindle 24 is vertical is set as the origin position of the A-axis.

When the A-axis and the C-axis are in their origin positions, the end surface of the spindle 24 and the tool T mounted on the spindle 24 face the table 26 on which the workpiece (not illustrated) is attached. A pair of Y-axis guide rails 46 extend on the upper surface of the bed 12 in the horizontal Y-axis direction (the left and right directions in FIG. 1), and a guide block 48 is attached to the table 26 so as to slide on the Y-axis guide rails 46. A ball screw (not illustrated) which extends in the Y-axis direction, and a Y-axis servo motor (not illustrated) connected to one end of the ball screw are provided as a Y-axis feed device for reciprocatively driving the table 26 along the Y-axis guide rails 46, and a nut (not illustrated) for engagement with the ball screw is attached to the table 26.

According to the present embodiment, in a machine tool comprising two rotary feed axes for controlling the posture of a tool and three linear feed axes for moving the position of a workpiece relative to the tool, the overhang of the moving body comprising the two rotary feed axes of the A-axis feed device and C-axis feed device and the spindle head 22 with respect to the column 14 can be reduced by inclining the C-axis pivot shaft 20, which forms one of the two rotary feed axes, toward the column 14, whereby the center of gravity of the moving body can be shifted toward the column 14 side. As a result, deformation of the column 14 and saddle 16 can be reduced. Furthermore, when the moving body moves, deformation of the saddle 16 and the Z-axis slider 18 during acceleration and deceleration is reduced.

A recess 16b is preferably formed in a front surface of the saddle 16, and the Z-axis ball screw 40 can be arranged in the recess 16b. Further, at least a part of the spindle head support part 60 can be arranged in the recess 16b of the saddle 16. As a result, the overhang of the moving body with respect to the column 14 can be further reduced.

REFERENCE SIGNS LIST

10 Machine Tool
12 Bed
14 Column
14a Inclined Surface
16 Saddle
16b Recess
18 Z-axis Slider
20 C-axis Pivot Shaft
20a Arm
20b Arm
21 A-axis Servo Motor
22 Spindle Head
22a A-axis Pivot Shaft
22b A-axis pivot shaft
24 Spindle
26 Table
28 X-axis Guide Rail
34 X-axis Servo Motor
36 Z-axis Guide Rail
42 Bracket
44 Z-axis Servo Motor
46 Y-axis Guide Rail
50 Bearing
52 C-axis Servo Motor
60 Spindle Head Support Part

The invention claimed is:
1. A machine tool comprising:
a bed,
a table provided on an upper surface of the bed so that the table is horizontally movable in forward and rearward directions, wherein a workpiece is secured to the table,
a column secured to the upper surface of the bed, and having a front portion proximate the table, a rear portion opposite to the front portion and distal to the table, and an inclined surface formed at a top of the column, the inclined surface extending diagonally upward from the front portion to the rear portion, an X-axis guide rail horizontally extending in left and right directions perpendicular to the forward and rearward directions, and disposed on the top of the column, a spindle having a tip on which a tool is mounted, a spindle head which supports the spindle so that the spindle is rotatable around an axis of rotation of the spindle, a C-axis pivot shaft which supports the spindle head so that the spindle head is rotatable around a first axis extending perpendicular to the axis of rotation of the spindle, a Z-axis slider which supports the C-axis pivot shaft so that the C-axis pivot shaft is rotatable around a second axis extending perpendicular to the first axis and diagonally upward from a front side of the machine tool to a rear side of the machine tool so that the second axis is inclined with respect to the vertical direction, and a saddle supported on a top of the column and disposed above the inclined surface so that the saddle is horizontally movable in the left and right directions along the X-axis guide rail, the saddle defining a front surface and a recess formed in the front surface, and configured to support the Z-axis slider so that the Z-axis slider is vertically reciprocatable, wherein at least a portion of the C-axis pivot shaft is arranged within the recess of the saddle and directly vertically above the column.

2. The machine tool of claim 1, wherein the C-axis pivot shaft comprises a pair of left and right arms formed on a tip of the C-axis pivot shaft in front of the column, the pair of left and right arms being configured to rotatably support the spindle head for rotation around the first axis.

3. The machine tool of claim 2, wherein the spindle head comprises a first pivot shaft and a second pivot shaft, wherein the first pivot shaft is supported on one of the pair of left and right arms, and the second pivot shaft is supported on the other of the left and right arm so that the first and second pivot shafts are rotatable around the first axis.

4. The machine tool of claim 1, further comprising a servo motor provided on the Z-axis slider and configured to rotatably drive the C-axis pivot shaft around the second axis of rotation.

* * * * *